(12) United States Patent
Wake et al.

(10) Patent No.: US 11,797,000 B2
(45) Date of Patent: Oct. 24, 2023

(54) UNMANNED AERIAL VEHICLE, CONTROL SYSTEM THEREOF AND CONTROL PROGRAM

(71) Applicant: NILEWORKS INC., Tokyo (JP)

(72) Inventors: Chihiro Wake, Tokyo (JP); Hiroshi Yanagishita, Tokyo (JP); Atsunori Saito, Tokyo (JP)

(73) Assignee: NILEWORKS INC., Tokyo (JP)

( * ) Notice: Subject to any disclaimer, the term of this patent is extended or adjusted under 35 U.S.C. 154(b) by 468 days.

(21) Appl. No.: 17/041,552

(22) PCT Filed: Mar. 26, 2019

(86) PCT No.: PCT/JP2019/012685
§ 371 (c)(1),
(2) Date: Nov. 17, 2020

(87) PCT Pub. No.: WO2019/189076
PCT Pub. Date: Oct. 3, 2019

(65) Prior Publication Data
US 2021/0116910 A1 Apr. 22, 2021

(30) Foreign Application Priority Data
Mar. 27, 2018 (JP) .................... 2018-059641

(51) Int. Cl.
*G05D 1/00* (2006.01)
*A01M 7/00* (2006.01)
(Continued)

(52) U.S. Cl.
CPC ............ *G05D 1/0055* (2013.01); *A01M 7/00* (2013.01); *B64C 39/024* (2013.01); *B64D 1/18* (2013.01);
(Continued)

(58) Field of Classification Search
CPC .. G05D 1/0055; G05D 1/0038; B64C 39/024; B64D 1/18; B64D 45/00;
(Continued)

(56) References Cited

U.S. PATENT DOCUMENTS 7,219,861 B1 * 5/2007 Barr ...................... A63H 30/04
244/190
8,989,922 B2 * 3/2015 Jones .................... B64C 39/024
701/3
(Continued)

FOREIGN PATENT DOCUMENTS

CN 106371450 A 2/2017
JP 10-297393 A 11/1998
(Continued)

OTHER PUBLICATIONS

International Search Report of PCT/JP2019/012685 dated Jun. 25, 2019.
(Continued)

*Primary Examiner* — Mussa A Shaawat
(74) *Attorney, Agent, or Firm* — MATTINGLY & MALUR, PC

(57) ABSTRACT

Being unable to restart when it collides with an object or crashes, an unmanned aerial vehicle, control system thereof and control program, for preventing damage caused by uncontrollable restarts and crashes is provided. The unmanned aerial vehicle includes a plurality of rotating bodies, a plurality of motors individually driving and rotating the plurality of rotating bodies, and a flight controller individually controlling the plurality of motors. The flight controller includes a collision/crash detection unit detecting collision or crash on the basis of a signal from a sensor, and
(Continued)

a power cut-off command unit cutting off a power supply on the basis of a detection signal from the collision/crash detection unit.

20 Claims, 9 Drawing Sheets

(51) Int. Cl.
  *B64C 39/02* (2023.01)
  *B64D 1/18* (2006.01)
  *B64D 45/00* (2006.01)
  *B64U 30/20* (2023.01)
  *B64U 50/19* (2023.01)

(52) U.S. Cl.
  CPC ...... *B64D 45/00* (2013.01); *B64D 2045/0085* (2013.01); *B64U 30/20* (2023.01); *B64U 50/19* (2023.01)

(58) Field of Classification Search
  CPC .. B64D 2045/0085; B64D 1/16; B64D 27/24; B64U 30/20; B64U 50/19; B64U 10/13; A01M 7/00
  See application file for complete search history.

(56) References Cited

U.S. PATENT DOCUMENTS

| | | | |
|---|---|---|---|
| 9,632,501 B1 | | 4/2017 | Yang et al. |
| 9,828,095 B1* | | 11/2017 | Wilcox ................ G05D 1/0808 |
| 10,155,587 B1* | | 12/2018 | Tang ........................ B64C 27/08 |
| 10,845,301 B2* | | 11/2020 | Ni ......................... G01N 21/314 |
| 11,591,110 B2* | | 2/2023 | Nakamura ............. B64D 17/72 |
| 2014/0008496 A1* | | 1/2014 | Ye ........................... A63H 27/02 |
| | | | 244/190 |
| 2015/0120094 A1* | | 4/2015 | Kimchi .................. G01C 21/20 |
| | | | 701/3 |
| 2016/0039529 A1* | | 2/2016 | Buchmueller .......... F16D 43/00 |
| | | | 244/65 |
| 2016/0144734 A1* | | 5/2016 | Wang ..................... B60L 53/124 |
| | | | 701/17 |
| 2016/0340006 A1* | | 11/2016 | Tang ...................... B64C 39/024 |
| 2016/0347462 A1* | | 12/2016 | Clark .................... G05D 1/0088 |
| 2016/0376031 A1* | | 12/2016 | Michalski .............. G08G 5/025 |
| | | | 701/15 |
| 2017/0253330 A1* | | 9/2017 | Saigh .................... G08G 5/0069 |
| 2018/0022310 A1* | | 1/2018 | Olson ..................... B64C 25/56 |
| | | | 244/100 A |
| 2018/0170535 A1 | | 6/2018 | Sato et al. |
| 2018/0364157 A1* | | 12/2018 | Ghiraldi ................... A01G 7/00 |
| 2019/0009893 A1 | | 1/2019 | Toyama et al. |
| 2020/0339278 A1* | | 10/2020 | Nakamura ............. B64D 17/80 |
| 2021/0309122 A1* | | 10/2021 | Wake ....................... B64D 1/18 |

FOREIGN PATENT DOCUMENTS

| | | |
|---|---|---|
| JP | 11-40205 A | 2/1999 |
| JP | 2001-120151 A | 5/2001 |
| JP | 2005-178558 A | 7/2005 |
| JP | 2017-163265 A | 9/2017 |
| JP | 2017-225286 A | 12/2017 |
| JP | 2019-14008 A | 1/2019 |
| WO | 2016/170565 A1 | 10/2016 |
| WO | 2017/154421 A1 | 9/2017 |
| WO | 2018/009254 A2 | 1/2018 |
| WO | 2018/012768 A1 | 1/2018 |

OTHER PUBLICATIONS

Chinese Office Action received in corresponding Chinese Application No. 201980010332.9 dated May 31, 2023.

* cited by examiner

UNMANNED AERIAL VEHICLE, CONTROL SYSTEM THEREOF AND CONTROL PROGRAM

TECHNICAL FIELD

The present invention relates to an unmanned aerial vehicle with improved safety, and a control system and a control program therefor.

BACKGROUND ART

The use of unmanned aerial vehicles such as small helicopters or multicopters generally called drones is in progress. Hereinafter, the unmanned aerial vehicle will be referred to as a "drone". One of the important fields of use of drones is the spraying of chemicals such as pesticides and liquid fertilizers on farmland, that is, farm fields (for example, see Patent Literature 1). In Japan where farmland is smaller than in the Europe and the U.S., the chemical spraying by drones are more suitable than the chemical spraying by manned airplanes and helicopters in many cases.

By using technologies such as a Quasi-Zenith Satellite System (QZSS) and a Real Time Kinematic—Global Positioning System (RTK-GPS), a drone can accurately know the absolute position of the own plane in centimeters during flight. Thus, even in the typical small and complex farmland in Japan, autonomous flight reduces the burden of manual maneuvering and enables efficient and accurate chemical spraying.

On the other hand, it is necessary to consider safety, for example, for autonomous drones used for spraying agricultural chemicals or the like. Since a drone loaded with chemicals weighs several tens of kilograms, the case of an accident such as falling onto a person may have serious consequences. Further, the operator of a drone is not an expert on drones, so therefore a foolproof mechanism is required to ensure safety even for non-experts. Until now, there have been drone safety technologies based on human control (for example, see Patent Literature 2), but there was no technology for addressing safety issues specific to autonomous drones for spraying agricultural chemicals.

CITATION LIST

Patent Literature

Patent Literature 1: JP 2001-120151 A
Patent Literature 2: JP 2017-163265 A

SUMMARY OF INVENTION

Technical Problem

The purpose of the present invention is to provide an unmanned aerial vehicle which is prevented from restarting when the unmanned aerial vehicle collides with an object or crashes, thereby preventing uncontrollability due to restart or occurrence of damage due to a crash or the like, and a control system and a control program therefor.

Solution to Problem

An unmanned aerial vehicle according to the present invention includes:

a plurality of rotating bodies; a plurality of motors which individually rotate and drive the plurality of rotating bodies; and a flight controller which individually controls the plurality of motors.

The flight controller includes
a collision/crash detection unit which detects collision or crash on the basis of a signal from a sensor, and
a power cut-off command unit which cuts off power supply on the basis of a detection signal from the collision/crash detection unit.

A control system for an unmanned aerial vehicle according to the present invention is a control system for an unmanned aerial vehicle which includes a plurality of rotating bodies, a plurality of motors which individually rotate and drive the plurality of rotating bodies, and a flight controller which individually controls the plurality of motors.

The flight controller includes
a collision/crash detection unit which detects collision or crash on the basis of a signal from a sensor, and
a power cut-off command unit which cuts off power supply on the basis of a detection signal from the collision/crash detection unit.

A control program for an unmanned aerial vehicle according to the present invention is a control program for an unmanned aerial vehicle which includes a plurality of rotating bodies, a plurality of motors which individually rotate and drive the plurality of rotating bodies, and a flight controller which individually controls the plurality of motors.

The control program causes a computer of the flight controller to realize:
a motor control function that individually controls the plurality of motors;
a collision/crash detection function that detects collision or crash on the basis of a signal from a sensor; and
a power cut off function that cuts off power supply on the basis of a detection signal obtained by the collision/crash detection function. Incidentally, the computer program can be provided by being downloaded via a network such as the Internet, or can be provided by being recorded in various computer-readable recording media such as a CD-ROM.

Advantageous Effects of Invention

According to the unmanned aerial vehicle according to the present invention, and the control system and the control program therefor, an unmanned aerial vehicle having a history of collision or crash has a high probability of causing an accident, and thus the occurrence of an accident can be prevented by cutting off power supply to prevent operation.

DESCRIPTION OF EMBODIMENTS

Hereinafter, an embodiment of an unmanned aerial vehicle according to the present invention, that is, a drone, and a control system and a control program therefor will be described with reference to the drawings. The illustrated embodiment is an example of a drone which is assumed to be used for agricultural purposes, but the purpose of the drone is not limited to this.

Embodiment

Overview of Unmanned Aerial Vehicle (Drone)

In this description, a drone is defined as a general unmanned aerial vehicle having multiple rotor blades or flight units. It does not matter whether a power means is an electric motor or a prime mover such as an internal combustion engine. It does not matter whether an operating system is wireless or wired, and autonomous type or manual flight type.

Figure 1:
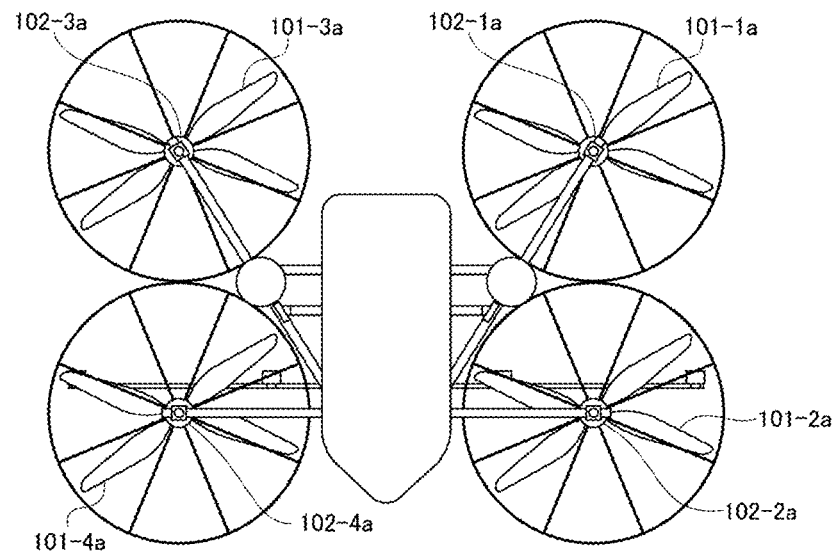
FIG. 1 is a plan view illustrating an example of the appearance of a drone as an unmanned aerial vehicle according to the present invention.
Figure 2:
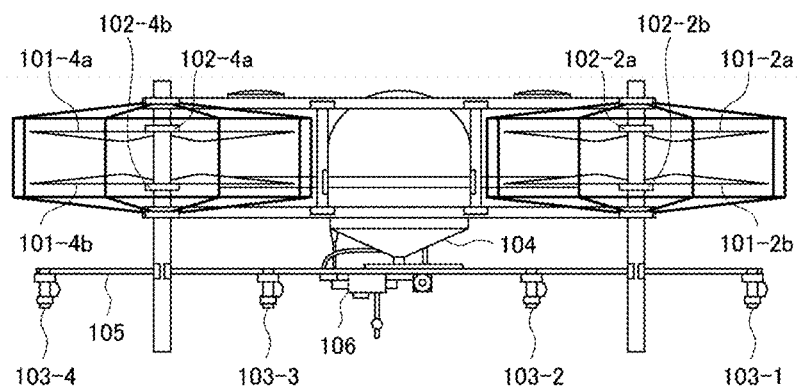
FIG. 2 is a front view of the drone.
Figure 3:
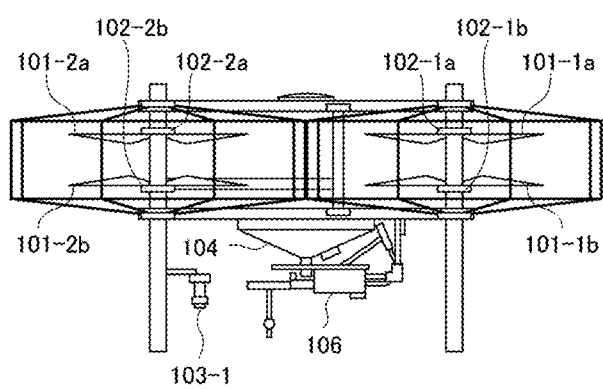
FIG. 3 is a right side view of the drone.

In FIGS. 1 to 3, eight rotor blades 101-1a, 101-1b, 101-2a, 101-2b, 101-3a, 101-3b, 101-4a, and 101-4b which are also called rotors or propellers are provided as units for flying a drone 100. Four sets of two-stage rotor blades, that is, total eight rotor blades are provided in consideration of the balance of flight stability, airframe size, and battery consumption.

Eight motors 102-1a, 102-1b, 102-2a, 102-2b, 102-3a, 102-3b, 102-4a, and 102-4b are provided as units which individually rotate and drive the rotor blades respectively. The driving means of the rotor blade is typically an electric motor but may be a motor such as a gasoline engine. The upper and lower rotor blades and the motors corresponding thereto in one set have axes on the same straight line for the flight stability or the like of the drone. One set of upper and lower rotor blades are rotationally driven in opposite directions and generate upward thrust together. Incidentally, although the rotor blade 101-3b and the motor 102-3b are not illustrated, their positions are obvious, and the rotor blade and the motor are placed at positions shown if there is a left side view.

Chemical nozzles 103-1, 103-2, 103-3, and 103-4 are units for spraying chemicals downward. Incidentally, the chemicals are referred to as liquids or powders sprayed on farm field such as pesticides, herbicides, liquid fertilizers, insecticides, seeds, and water.

A chemical tank 104 is a tank for storing chemicals to be sprayed, and is provided at a position close to the center of gravity of the drone 100 and lower than the center of gravity from the viewpoint of weight balance. Chemical hoses 105 are units for connecting the chemical tank 104 with respective chemical nozzles 103-1, 103-2, 103-3, and 103-4. The chemical hoses 105 are made of a hard material and may also serve to support the respective chemical nozzles. A pump 106 is a unit for discharging the chemicals from the nozzle.

Figure 4:
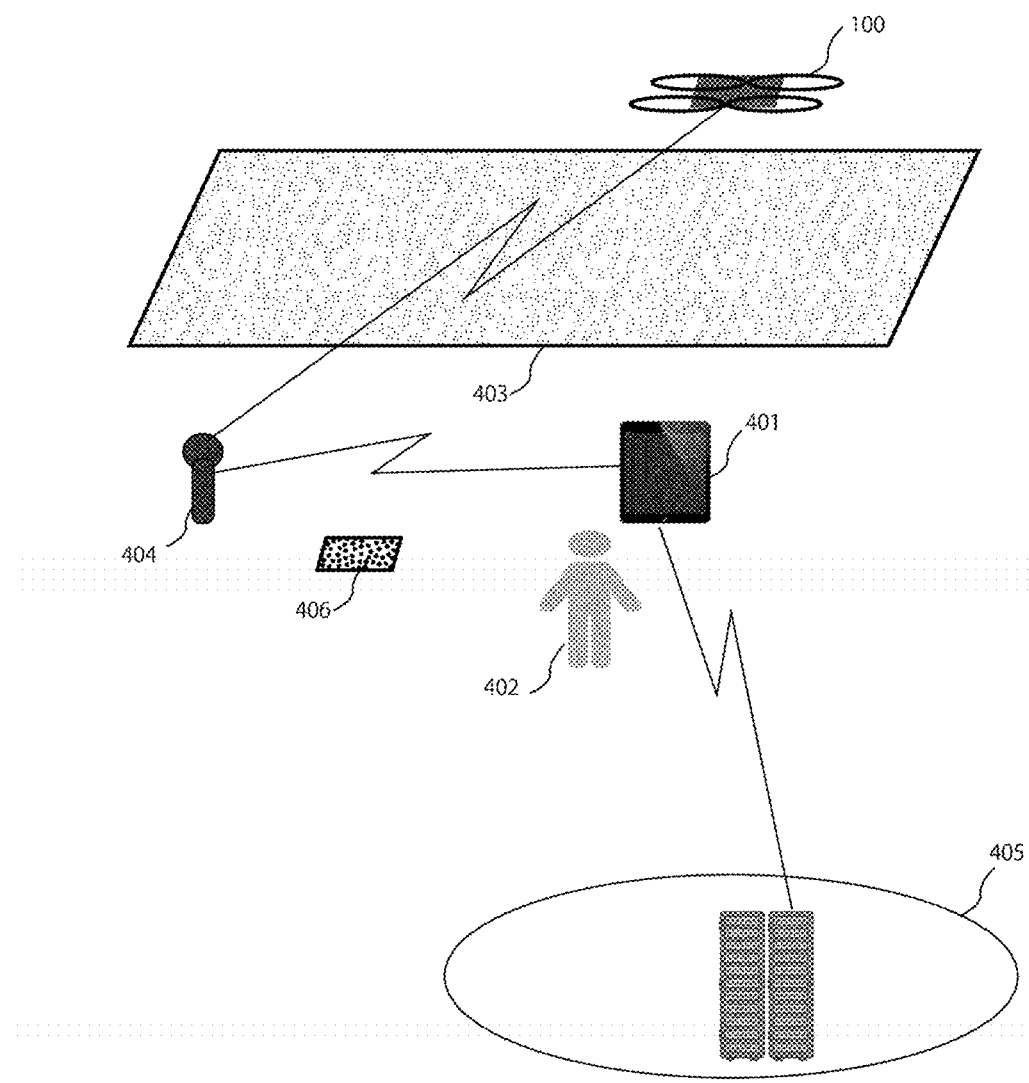
FIG. 4 is a conceptual diagram illustrating an example in which the drone is used for chemical spraying for agricultural purposes.

FIG. 4 illustrates an overall conceptual view of a system using an embodiment of a chemical spraying application of the drone 100 according to the present invention. This drawing is a schematic view, and the scale is not accurate. A remote controller 401 has a unit for transmitting a command to the drone 100 by the operation of a user 402 and displaying information, such as a position, a chemical amount, a battery level, and a camera image, received from the drone 100. The remote controller 401 may be realized by a portable information device such as a general tablet terminal for operating a computer program.

It is desirable that the drone 100 according to the present invention be controlled to perform autonomous flight. However, a manual operation is desirably performed at the time of basic operation such as take-off and return and emergency. In addition to portable information devices, an emergency operation device having an exclusive emergency stop function may be used. Desirably, the emergency operation device is a dedicated device which is equipped with a large emergency stop button or the like so as to be able to respond quickly in case of emergency. The remote controller 401 and the drone 100 can perform wireless communication by Wi-Fi or the like.

A farm field 403 is a rice field, an upland field, or the like targeted for chemical spraying by the drone 100. Actually, the topography of the farm field 403 is complicated, and there is a case where the topographic map cannot be obtained in advance, or the topographic map and the situation of the site are inconsistent. Usually, the farm field 403 is adjacent to a house, a hospital, a school, a farm field for other crops, a road, a railroad, and the like. Further, there may also be obstacles such as buildings and electric wires in the farm field 403. Usually, the drone 100 takes off from a landing point outside the farm field 403, and returns to the landing point after spraying chemicals on the farm field 403, or when it becomes necessary to replenish the chemicals or charge.

A base station 404 is a device which provides a master unit function of Wi-Fi communication and the like. The base station also functions as an RTK-GPS base station to provide the accurate position of the drone 100. The master unit function of Wi-Fi communication and the RTK-GPS base station may be independent devices. A farm cloud 405 is typically a group of computers operated on a cloud service, and it is desirable that the farm cloud 405 be wirelessly connected to the remote controller 401 via a mobile phone line or the like. The farm cloud 405 analyzes the image of the farm field 403 photographed by the drone 100, grasps the growth status of crops, and performs processing for determining a flight route. Further, the drone 100 may be provided with the stored topographical information or the like of the farm field 403. In addition, the history of the flight of the drone 100 and photographed images may be accumulated to perform various analysis processes.

Figure 5:
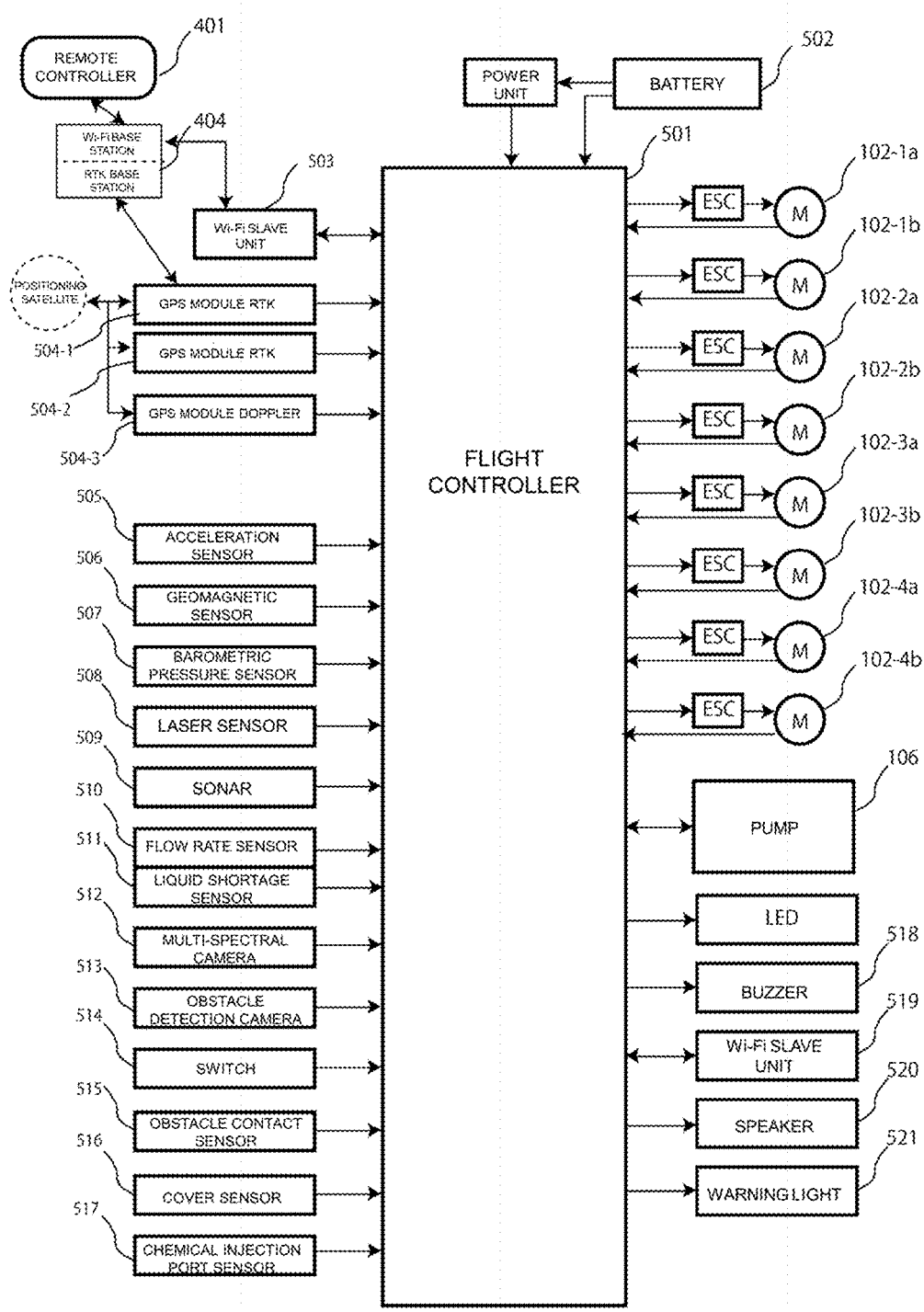
FIG. 5 is a block diagram illustrating an example of the entire electrical control system of the drone.

FIG. 5 illustrates an example of a control system for a chemical spraying drone. A flight controller 501 includes a component which controls the entire drone, and specifically may be an embedded computer including a CPU, memory, related software, and the like. The flight controller 501 controls the flight of the drone 100 by controlling the rotation speed of the eight motors 102-1a, 102-1b, 102-2a, 102-2b, 102-3a, 102-3b, 104-a, and 104-b with control means such as electronic speed control (ESC) on the basis of the input information received from the remote controller 401 and the input information obtained from various sensors described later. A configuration is made such that the actual rotation speed of each motor is fed back to the flight controller 501, and it is monitored whether or not a normal rotation is performed.

The software used by the flight controller 501 is preferably rewritable through a storage medium or the like for function expansion/change, problem correction, or the like, or through communication means such as Wi-Fi or USB. In this case, it is desirable that the protection by encryption, checksum, electronic signature, virus check software, and the like prevent rewriting performed by unauthorized software. In addition, a part of a calculation process used in the control by the flight controller 501 may be executed by another computer existing on the remote controller 401, the farm cloud 405, or another place. Since the flight controller 501 is highly important, some or all of the components thereof may be duplexed.

A battery 502 is a unit which supplies power to the flight controller 501 and other components of the drone, and is desirably rechargeable. The battery 502 is desirably connected to the flight controller 501 via a fuse or a power unit including a circuit breaker or the like. The battery 502 is desirably a smart battery which has a function of transmitting the internal state (such as the amount of stored electricity and accumulated usage time) of the battery to the flight controller 501 in addition to power supply.

The power supply system from the battery 502 is divided into a power supply system of a power system which supplies the driving power to the motor and a power supply system of a control system such as the flight controller 501. In this way, a time difference can be given between cutting off the power supply to the power system and cutting off the power supply to the control system described later.

The flight controller 501 has a function that transmits and receives signals to and from the remote controller 401 via a Wi-Fi slave unit function 503 and further via the base station 404. That is, the flight controller 501 has a function that receives a necessary command from the remote controller 401 and transmit necessary information to the remote controller 401. It is desirable to encrypt this communication so as to prevent illegal acts such as interception, spoofing, and hijacking of equipment. The base station 404 desirably has an RTK-GPS base station function in addition to a Wi-Fi communication function. By combining a signal from the RTK base station and a signal from a GPS positioning satellite, a GPS module 504 can measure the absolute position of the drone 100 with an accuracy of about several centimeters.

A six-axis gyro sensor 505 measures the acceleration of a drone body in three axis directions orthogonal to each other and measures the angular velocities in the rotation direction around the three axes, that is, the rolling direction, the pitching direction, and the yawing direction. A velocity can be calculated by integrating the acceleration or angular velocity detected by the six-axis gyro sensor 505. A geomagnetic sensor 506 is a unit which measures the direction of the drone body by measuring geomagnetism. A barometric pressure sensor 507 is a unit which measures atmospheric pressure, and can indirectly measure the altitude of the drone. An infrared laser sensor 508 is a unit which measures the distance between the drone body and the ground surface by utilizing the reflection of infrared laser. A sonar 509 is a unit which measures the distance between the drone body and the ground surface by utilizing the reflection of ultrasonic waves.

These sensors may be selected according to the cost target and performance requirements of the drone. Further, a gyro sensor (angular velocity sensor) which measures the tilt of the airframe, a wind force sensor for measuring wind force, and the like may be added. It is desirable that these sensors be duplexed or multiplexed. In a case where there are multiple sensors for the same purpose, the flight controller 501 may use only one of a plurality of sensors, and when the sensor fails, the sensor may be switched to use an alternative sensor. Alternatively, a plurality of sensors may be used at the same time, and a case where respective measurement results do not match may be considered that a failure occurs.

A flow rate sensor 510 is a unit for measuring the flow rate of the chemicals, and the flow rate sensors are desirably provided at a plurality of places on the path from the chemical tank 104 to the chemical nozzle 103. A liquid shortage sensor 511 is a sensor which detects that the amount of the chemicals is equal to or less than a predetermined amount. A multi-spectral camera 512 is a unit which photographs the farm field 403 and obtains data for image analysis. An obstacle detection camera 513 is a camera for detecting obstacles to the drone. The obstacle detection camera has different image characteristics and lens direction from those of the multi-spectral camera 512.

An obstacle contact sensor 515 is a sensor for detecting that the drone 100, particularly, a rotor or a propeller guard part thereof is in contact with an obstacle such as an electric wire, a building, a human body, a standing tree, a bird, or other drone. A cover sensor 516 is a sensor which detects that an operation panel of the drone 100 and a cover for internal maintenance are open. A chemical injection port sensor 517 is a sensor which detects that the injection port of the chemical tank 104 is open. These sensors may be selected according to the cost target and performance requirements of the drone and may be duplexed or multiplexed.

The flight controller 501 transmits a control signal to the pump 106 to adjust the discharging amount of the chemicals and stop the chemical discharging. It is desirable that the current status, such as the rotation speed, of the pump 106 be fed back to the flight controller 501.

An LED 107 is a display unit for notifying a drone operator of the state of the drone. Instead of or in addition to the LED, a display unit such as a liquid crystal display may be used. A buzzer 518 is an output unit for notifying a drone state (particularly an error state) by an audio signal.

A Wi-Fi slave unit 519 is an optional component for communicating with an external computer or the like for the transfer of software, for example, separately from the remote controller 401. Instead of or in addition to the Wi-Fi slave unit 519, another wireless communication means such as infrared communication, Bluetooth (registered trademark), ZigBee (registered trademark), and NFC or wired communication means such as USB connection may be used.

A speaker 520 is an output unit for notifying the drone state, particularly, an error state by the recorded human voice, synthesized voice, or the like. There is a case where it is difficult to see the visual display of the drone in flight in some weather conditions, and in such a case, it is effective to communicate the situation by voice. A warning light 521 is a display unit such as a strobe light for notifying the drone state, particularly, an error state. These input/output units may be selected according to the cost target and performance requirements of the drone and may be duplexed or multiplexed.

Example of Characteristic Control System of the Present Invention

Figure 6:
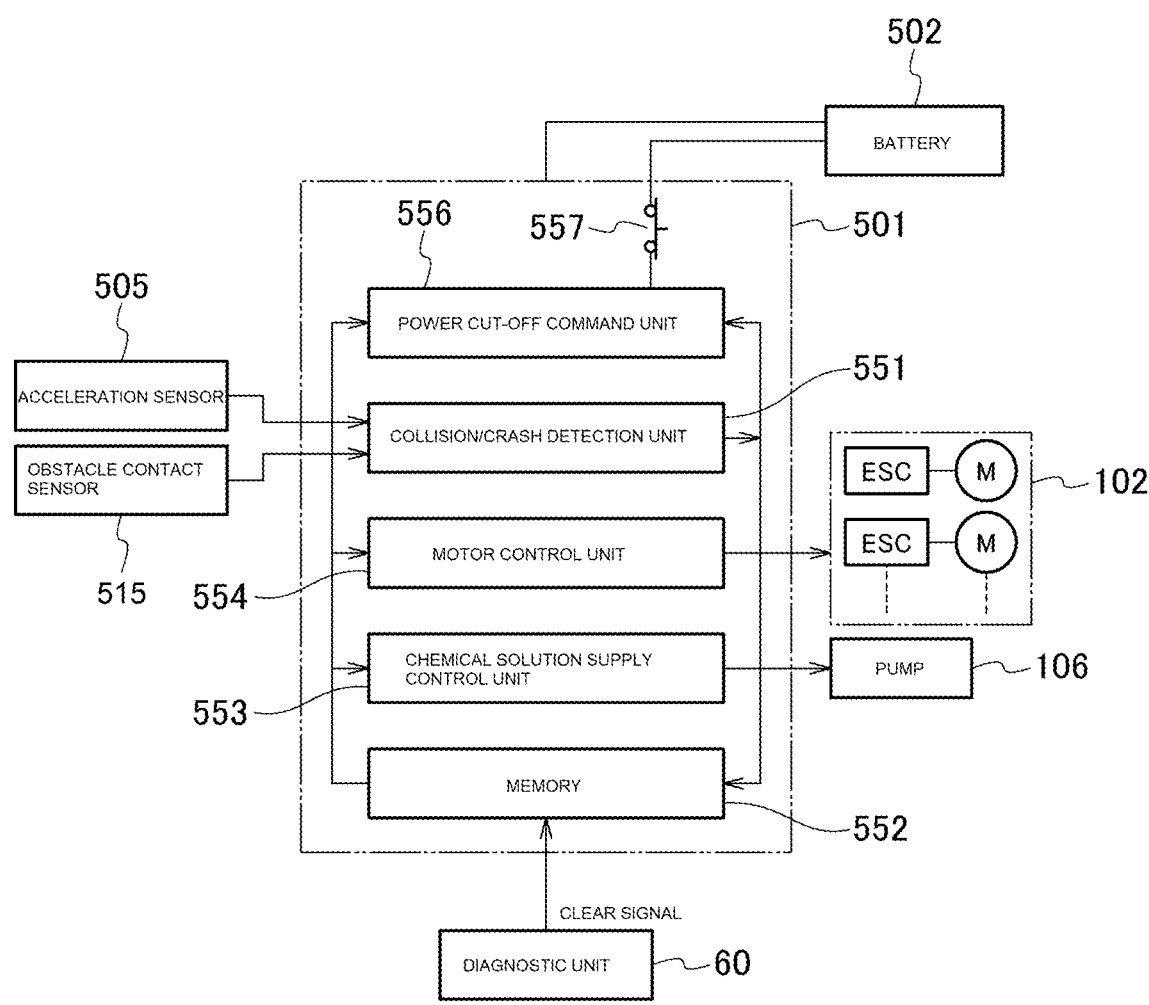
FIG. 6 is a more specific block diagram illustrating an example of a characteristic control system portion of the present invention among the control systems.

Hereinafter, an example of the characteristic control system of the present invention will be described with reference to FIG. 6. In FIG. 6, the flight controller 501 includes a collision/crash detection unit 551, a memory 552, a chemical solution supply control unit 553, a motor control unit 554, and a power cut-off command unit 556. Each of components represents the function realized by the computer configuring the main body of the flight controller 501 for each block. In FIG. 6, eight motors are represented as a group of motors 102.

The flight controller 501 has a switch 557 which turns the power supply line from the battery 502 on and off. A switch 557 is turned on and off by a command from the power cut-off command unit 556, and when the switch 557 is turned off, the power supply is cut off, and the motor 102 cannot be activated.

By a signal from a sensor mounted on the drone, the collision/crash detection unit 551 detects that the drone collides with an obstacle such as an object or a person or crashes. In this embodiment, the six-axis gyro sensor 505 and an obstacle contact sensor 515 are used as the above sensors. The six-axis gyro sensor 505 is configured as described above and is mounted to control the attitude of the drone.

An acceleration sensor and an angular velocity sensor configuring the six-axis gyro sensor detect abnormal acceleration when a drone collides with an obstacle during flight or when a foreign object such as a bird or a leaf is caught. For example, a relatively small acceleration is added in the case of collision with a flying bird called a bird strike. On the other hand, in the case of collision with a strong structure or the like, for example, a large acceleration of up to 20 G is applied. In this regard, when the threshold value for detection by the acceleration sensor or the angular velocity sensor is set to two large and small levels, it is possible to detect whether the collision is relatively light or severe. In any case, when an acceleration or angular velocity which is impossible in normal flight is applied, the six-axis gyro sensor can output a signal corresponding thereto and thus can be used as a detection unit for collision or crash of the drone. A signal from at least one sensor of the sensors configuring the six-axis gyro sensor can be used as a detection signal of the six-axis gyro sensor 505.

The obstacle contact sensor 515 can be configured by a sensor linked to the propeller guard of the drone. The propeller guard is provided to prevent the propeller from coming into contact with an obstacle and to prevent the propeller from coming into contact with the human body or the like and damaging the human body or the like. In a case where an abnormal impact force is applied to the propeller guard, when a sensor is provided which operates by this impact force, this sensor can be used as the obstacle contact sensor 515.

When the collision/crash detection unit 551 detects a collision or a crash of the drone, the memory 552 keeps a history of the drone by storing the detection signal. The stored data of the memory 552 is input to the chemical solution supply control unit 553, the motor control unit 554, and the power cut-off command unit 556.

The chemical solution supply control unit 553 operates the pump 106 at the time of spraying the chemical solution. The chemical solution supply control unit 553 has a function that stops the pump 106 and stops spraying the chemical solution by the detection signal output from the collision/crash detection unit 551 due to the collision or crash of the drone or by the detection signal stored in the memory 552.

The motor control unit 554 individually controls each of the eight motors illustrated in FIG. 5 via the ESC, and controls the ascent and descent, forward and backward movement, movement to right and left, and further speed of the drone. The detection signal is input to the motor control unit 554 from the collision/crash detection unit 551, or the detection signal is input from the memory. When the detection signal is input, the motor control unit 554 stops the power supply to a group of motors 102 to stops all the motors 102, thereby stopping the rotating bodies.

The detection signal is also input to the power cut-off command unit 556 from the collision/crash detection unit 551, and when the memory 552 stores the detection signal, the detection signal is also input from the memory 552. When the detection signal is input, the power cut-off command unit 556 turns off the switch 557 and cuts off the power supply from the battery 502.

A diagnostic unit 60 illustrated in FIG. 6 diagnoses the operation of each part of the drone, and thus is installed in a place different from the drone, for example, a maintenance place. The diagnosis result of the drone by the diagnostic unit 60 is input to the memory 552. When the drone has a history of collision, crash, or the like, the history is stored in the memory 552, the power supply is cut off as described above, and the drone cannot be activated. Alternatively, even when the drone can be activated, the drone cannot be flown. When the drone is maintained, and the damaged part of a sensor, a control system, and the like is restored to operate normally, the diagnostic unit 60 outputs a clear signal to the memory 552.

When the clear signal is input to the memory 552, the detection signal input and stored from the collision/crash detection unit 551 is erased, and the history related to the collision or the crash is erased. Therefore, when all the components of the drone are restored to operate normally, the history of the memory 552 is cleared, a non-activatable state, that is, an interlock state is released, and the drone can fly again.

The memory 552 may be a non-volatile memory. According to this configuration, even in a case where the power is cut off by the power cut-off command unit 556, a memory of collision or crash can be retained so as to prevent that the drone having a history of collision or crash is turned on to be allowed to fly. That is, safety can be ensured by preventing the flight of the drone which may have a problem due to collision or crash and reliably performing maintenance.

The overall configuration of the embodiment of the unmanned aerial vehicle according to the present invention has been described above. Next, some feature parts of the embodiment will be described with reference to the flowcharts illustrated in FIG. 7 and following drawings. In each flowchart, reference numerals S1, S2, and so on indicate operation steps. The present invention is also an invention of an unmanned aerial vehicle, that is, a drone, and can be regarded as a drone control system and a drone control program.

First Embodiment

Figure 7:
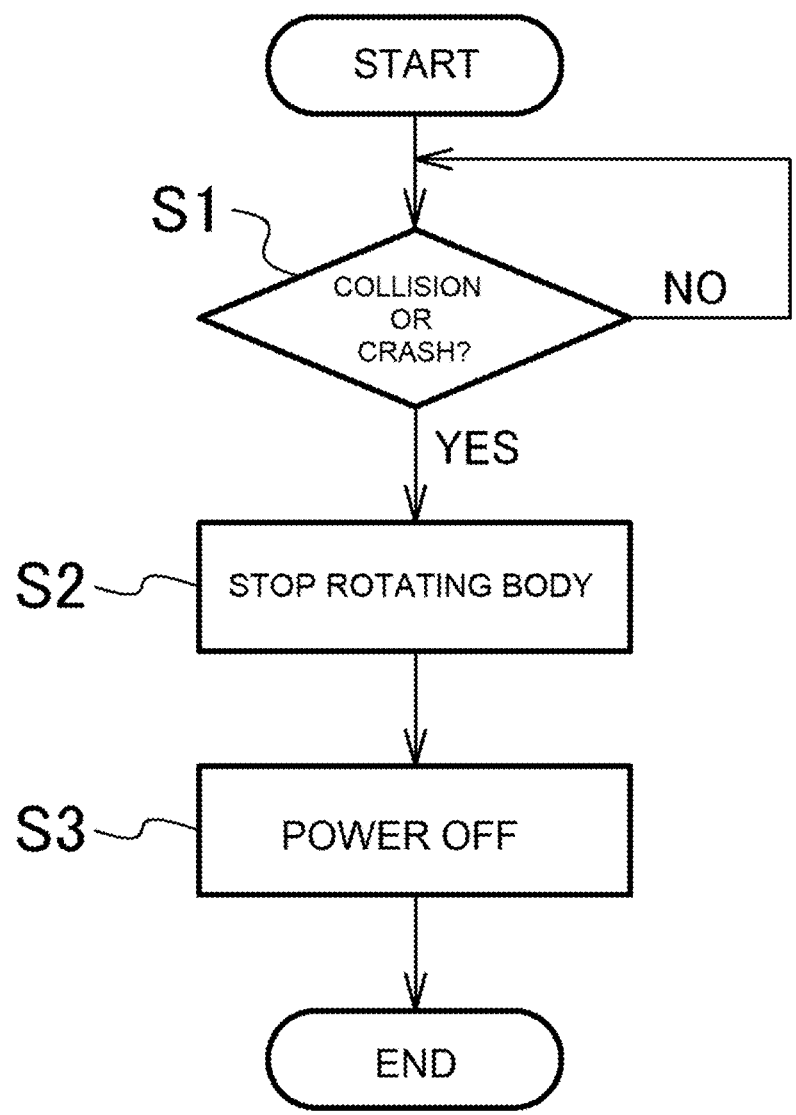
FIG. 7 is a flowchart illustrating an operation of a first embodiment of the present invention.

In FIG. 7, when the drone is in operation, the collision/crash detection unit 551 constantly monitors the detection signals of the six-axis gyro sensor 505 (see FIG. 6) and the obstacle contact sensor 515 (S1). The six-axis gyro sensor 505 and the obstacle contact sensor 515 are sensors which detect the collision or crash of a drone. When the collision/ crash detection unit 551 detects collision or crash, this detection signal is input to the motor control unit 554. The motor control unit 554 outputs a command signal to stop all the motors 102, and stops all the rotating bodies (S2). The drone descends or crashes on the spot. After that, a power cut-off command unit is issued from the power cut-off command unit 556, and the switch 557 is turned off to cut off the power supply of the power system (S3).

When the drone collides with an obstacle or the like or crashes, the airframe is damaged, and when the drone is restarted as it is, a probability of being out of control or crashing increases, and there is a possibility of causing great damage to people, objects, and the like. According to the first embodiment, when it is detected that the drone collides or crashes, first, the rotating body is stopped, and the drone descends or crashes on the spot. When the drone descends or crashes while the rotating body is rotating, there is a possibility of causing great damage to people and objects around the drone. In this regard, first, the rotation of the rotating body is stopped, so as to prevent the damage to people or objects or to make the damage as small as possible. Then, the power is cut off. When the power is cut off first, the control operation of each part becomes impossible at the same time, and the behavior of the drone becomes unpredictable. Thus, the rotating body is stopped before the power is cut off.

Second Embodiment

Figure 8:
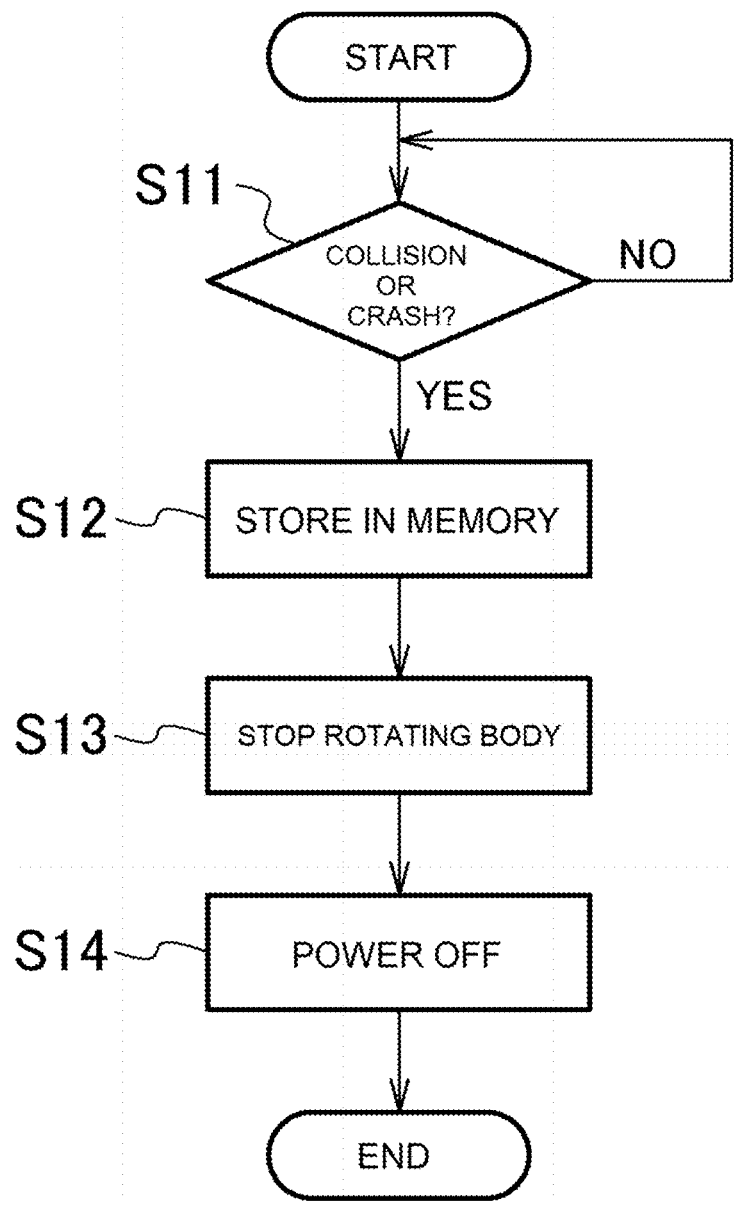
FIG. 8 is a flowchart illustrating an operation at the time of collision/crash detection of a second embodiment of the present invention.
Figure 9:
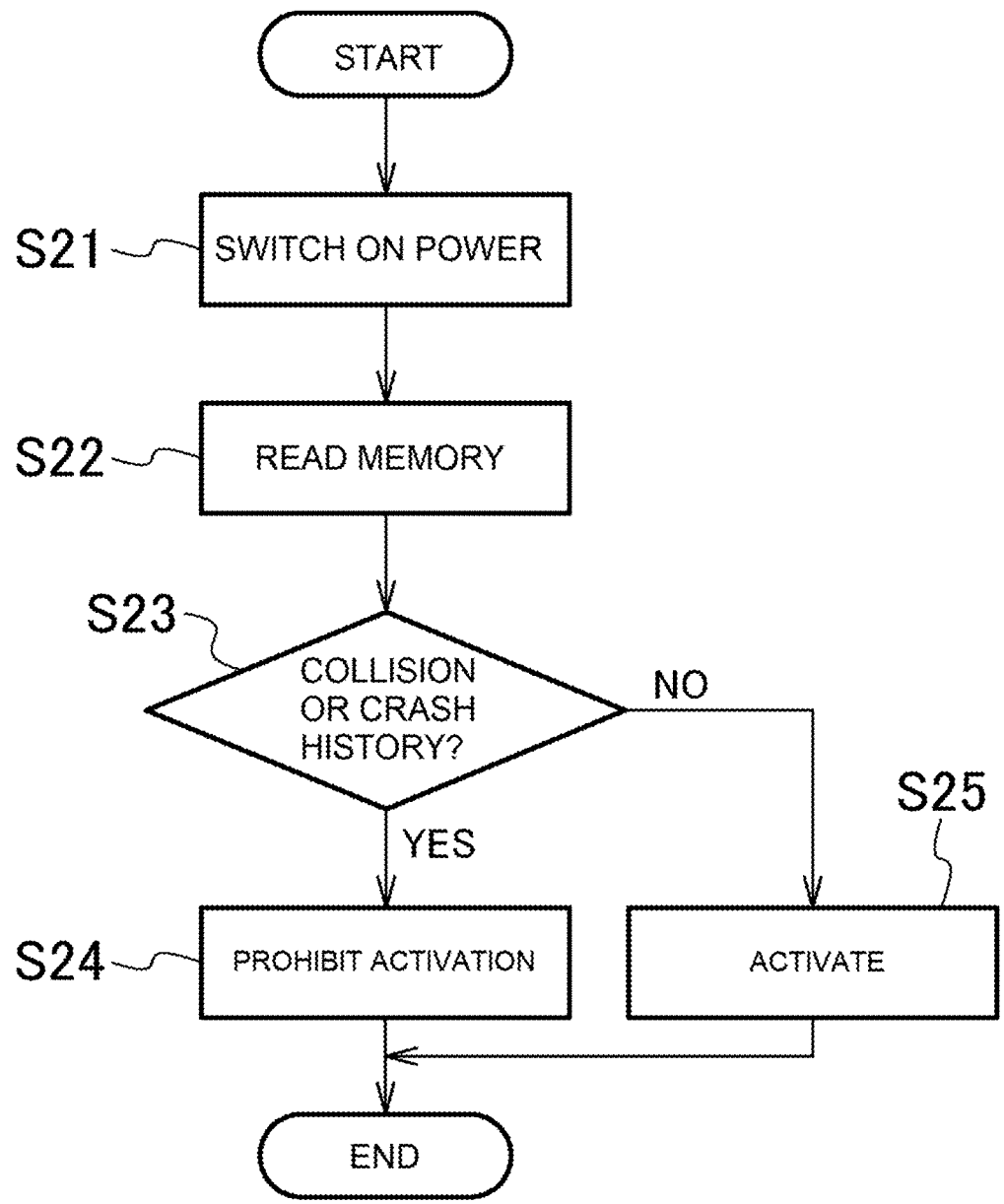
FIG. 9 is a flowchart illustrating an operation at activation of the second embodiment.

A second embodiment is illustrated in FIGS. 8 and 9. The difference of this embodiment from the first embodiment is that the memory 552 stores a history of collision and crash. As illustrated in FIG. 8, the collision/crash detection unit 551 constantly monitors collision or crash with the detection signal of the obstacle contact sensor 515 (S11). When collision or crash is detected, this detection signal is stored in the memory 552 (S12). Next, by the detection signal of the collision/crash detection unit 551 or by reading the detection signal from the memory 552, the motor control unit 554 outputs a command signal to stop all the motors 102. Accordingly, all rotating bodies are stopped (S13) and then the power is cut off (S14).

When the collision/crash detection unit 551 detects collision or crash, processing is performed in such an order that the detection signal is stored in the memory 552, then the motor 102 is stopped, and the power is cut off. Accordingly, storing in the memory 552 is performed reliably.

FIG. 9 illustrates the operation at activation in the second embodiment. The power switch is turned on to activate the drone (S21). The power switch is a switch which enables power supply from the battery 502 illustrated in FIG. 6 and is a power supply switch to the control system different from the switch 557 illustrated in FIG. 6. The stored data in the memory 552 is read out by turning on the power switch (S22).

From the read signal of the memory 552, it is determined whether or not there is a history of collision/crash (S23), and the activation is prohibited when there is a history of collision/crash (S24). The prohibition of the activation is performed by turning off switch 557 by the power cut-off command unit 556. When there is no history of collision or crash, the power cut-off command unit 556 activates the drone by turning on switch 557 (S25).

According to the second embodiment, when the drone collides or crashes, the history is stored in the memory, and the drone is interlocked and cannot be restarted. In this way, by restricting the activation of a drone with a high probability of accident occurrence, it is possible to provide a highly safe drone and a control system and a control program therefor.

Third Embodiment

Figure 10:
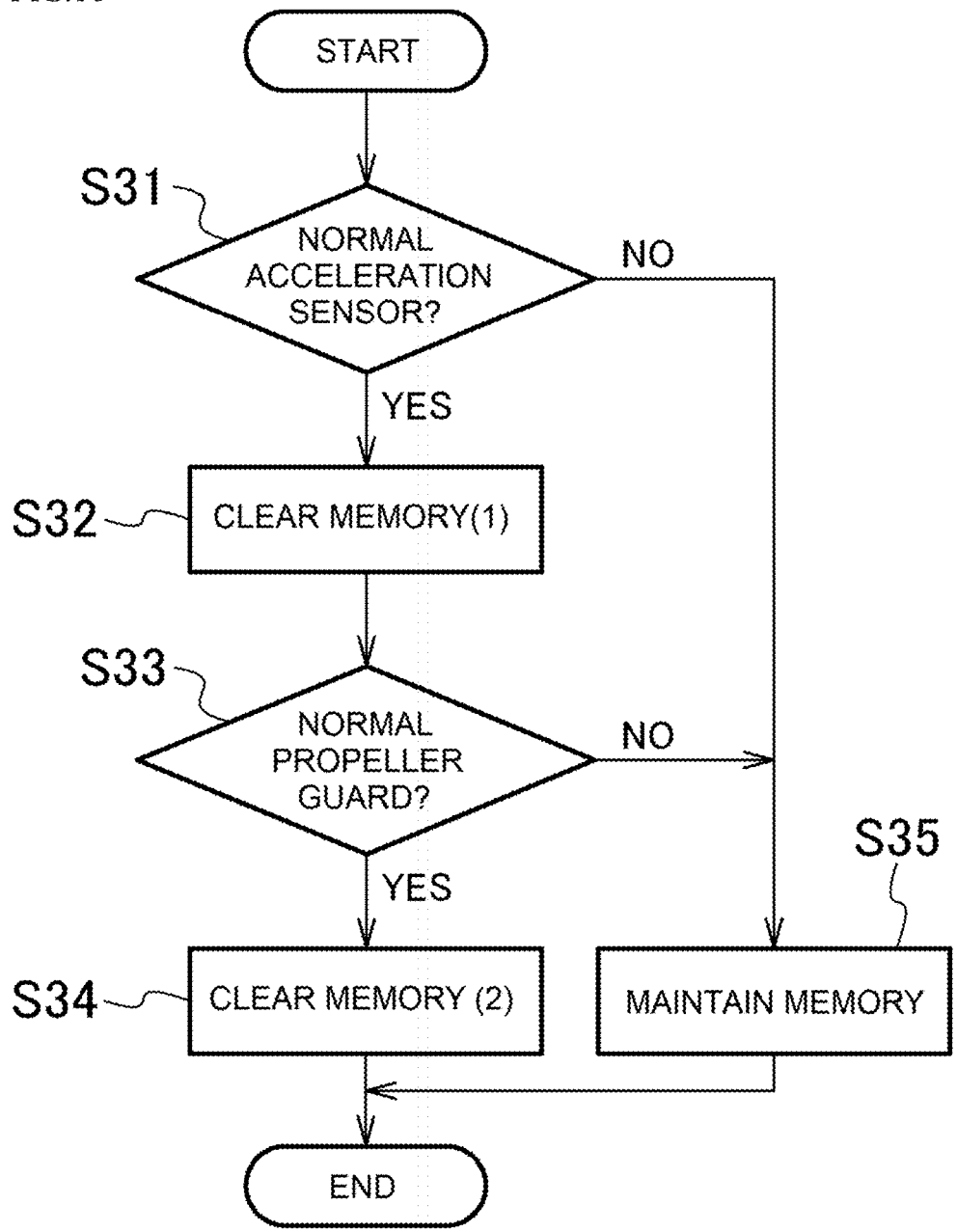
FIG. 10 is a flowchart illustrating an operation of a third embodiment of the present invention.

A third embodiment is illustrated in FIG. 10. In the third embodiment, the diagnostic unit 60 illustrated in FIG. 6 and the drone are linked to diagnose whether or not the drone can operate normally, and in a case where it is determined that the drone can operate normally, a so-called interlock is released. The diagnostic unit 60 and the drone can be linked by setting the drone in a predetermined position of the diagnostic unit or by connecting the flight controller 501 of the drone and the diagnostic unit 60 by a cable.

The diagnostic unit 60 diagnoses whether or not the acceleration sensor configuring the six-axis gyro sensor 505 operates normally (S31), and when it is determined to be normal, the stored data of the memory 552 regarding the detection signal of the six-axis gyro sensor 505 is cleared (S32) and the process proceeds to step S33. In a case where it is determined in step S31 that the operation of the acceleration sensor configuring the six-axis gyro sensor 505 is abnormal, the stored data of the memory 552 regarding the six-axis gyro sensor 505 is maintained (S35).

In step S33, it is determined whether or not the propeller guard is normal. The propeller guard also serves as the obstacle contact sensor 515 as described above. Step S33 is a step of determining whether or not the obstacle contact sensor 515 and the collision/crash detection unit 551 operate normally. When the propeller guard is normal, the stored data in the memory 552 regarding the detection signal of the propeller guard is cleared (S34). In a case where it is determined in step S33 that the operation of the propeller guard is abnormal, the stored data in the memory 552 regarding the propeller guard is maintained (S35).

According to the above embodiment, the operations of the propeller guard configuring the obstacle contact sensor 515 and the six-axis gyro sensor 505 are diagnosed, and when all of the operations are diagnosed as normal, the memory 552 is cleared. When the memory 552 is cleared, the clearing of the memory 552 in this case means that the history of collision and crash is erased, and the power cut-off command unit 556 turns on the switch 557 to restore the power supply. In this way, the interlock is released, and the drone can be restarted.

When a drone with a history of collision and crash is repaired and reused, the diagnosis by the diagnostic unit 60 can be performed to confirm whether or not the repair is completed. Further, even for a drone with no history of collision or crash and a newly purchased drone, the diagnostic unit 60 can diagnose whether or not the operation is performed normally.

The diagnostic unit 60 is arranged in the service department or maintenance department of the drone. Only after it is diagnosed as a result of diagnosis in these departments that all the operations of the drone are normal, the interlock can be released, and the drone can be reused.

Fourth Embodiment

A fourth embodiment is an example in which safety in the case of collision or crash is ensured in a drone, such as an agricultural drone, capable of spraying the chemical solution. The operation flow can be realized by replacing step S2 with "chemical spraying stop" in the flow illustrated in FIG. 7. The "chemical spraying stop" can be performed when the pump 106 is stopped by the chemical solution supply control unit 553 illustrated in FIG. 6.

According to the fourth embodiment, when the collision or crash of the drone is detected, the chemical solution supply control unit 553 stops the spraying of the chemical solution before the power supply is cut off by the power cut-off command unit 556, thereby preventing the scattering of the chemical solution.

The timing at which the collision or crash of the drone is detected, and the spraying of the chemical solution is stopped may be the same as the timing at which the rotating body is stopped. Therefore, step S2 of the operation flow illustrated in FIG. 7 may be "rotating body stop and chemical solution spraying stop".

INDUSTRIAL APPLICABILITY

Although the present invention relates to an unmanned aerial vehicle called a drone, the technical idea of the present invention is also applicable to a moving body on land, on water, and in water.

REFERENCE SIGNS LIST

60 Diagnostic unit
102 Motor
501 Flight controller
502 Battery
505 Six-axis gyro sensor
515 Obstacle contact sensor
551 Collision/crash detection unit
552 Memory
553 Chemical solution supply control unit
554 Motor control unit
556 Power cut-off command unit
557 Switch

The invention claimed is:

1. An unmanned aerial vehicle, comprising:
a plurality of rotating bodies;
a plurality of motors individually driving and rotating the plurality of rotating bodies; and
a flight controller individually controlling the plurality of motors,
wherein the flight controller includes:
a collision/crash detection unit detecting collision or crash on the basis of a signal from a sensor; and
a memory storing a detection signal from the collision/crash detection unit, and
wherein the flight controller prohibits activation or flight of the unmanned aerial vehicle when data of collision or crash is stored in the memory.

2. The unmanned aerial vehicle according to claim 1, further comprising a battery, wherein the unmanned aerial vehicle cuts off a power supply from the battery to prohibit activation of the unmanned aerial vehicle.

3. The unmanned aerial vehicle according to claim 1, wherein the unmanned aerial vehicle reads a stored data of the memory when the unmanned aerial vehicle is activated.

4. The unmanned aerial vehicle according to claim 1, further comprising a power cut-off command unit cutting off a power supply on the basis of the detection signal from the collision/crash detection unit.

5. A control system of controlling an unmanned aerial vehicle, comprising:
a collision/crash detection unit detecting collision or crash on the basis of a signal from a sensor; and
a memory storing a detection signal from the collision/crash detection unit; and
wherein the control system prohibits activation or flight of the unmanned aerial vehicle when data of collision or crash is stored in the memory, and
wherein the unmanned aerial vehicle comprises:
a plurality of rotating bodies;
a plurality of motors individually driving and rotating the plurality of rotating bodies; and
a flight controller individually controlling the plurality of motors.

6. The control system according to claim 5,
wherein the unmanned aerial vehicle further comprises a battery, and
wherein the control system cuts off a power supply from the battery to prohibit activation of the unmanned aerial vehicle.

7. The control system according to claim 5, wherein the control system reads a stored data of the memory when the unmanned aerial vehicle is activated.

8. The control system according to claim 5, further comprising a power cut-off command unit cutting off a power supply on the basis of the detection signal from the collision/crash detection unit.

9. An unmanned aerial vehicle, comprising:
a plurality of rotating bodies;
a plurality of motors individually driving and rotating the plurality of rotating bodies;
a flight controller individually controlling the plurality of motors; and
a diagnostic unit diagnosing the unmanned aerial vehicle,
wherein the flight controller includes:
a collision/crash detection unit detecting collision or crash on the basis of a signal from a sensor; and
a memory storing a detection signal from the collision/crash detection unit, and
wherein the unmanned aerial vehicle allows the unmanned aerial vehicle to activate or fly when the diagnostic unit diagnoses that the unmanned aerial vehicle operates normally.

10. The unmanned aerial vehicle according to claim 9, wherein the unmanned aerial vehicle allows the unmanned aerial vehicle to activate or fly and clears a collision/crash data stored in the memory when the diagnostic unit determines that the unmanned aerial vehicle operates normally.

11. The unmanned aerial vehicle according to claim 9, further comprising a power cut-off command unit cutting off a power supply on the basis of the detection signal from the collision/crash detection unit.

12. A control system of controlling an unmanned aerial vehicle, comprising:
a collision/crash detection unit detecting collision or crash on the basis of a signal from a sensor;
a memory storing a detection signal from the collision/crash detection unit; and
a diagnostic unit diagnosing the unmanned aerial vehicle,
wherein the control system allows the unmanned aerial vehicle to activate or fly when the diagnostic unit diagnoses that the unmanned aerial vehicle operates normally, and
wherein the unmanned aerial vehicle comprises:
a plurality of rotating bodies;
a plurality of motors individually driving and rotating the plurality of rotating bodies; and
a flight controller individually controlling the plurality of motors.

13. The control system according to claim 12, wherein the control system allows the unmanned aerial vehicle to activate or fly and clears a collision/crash data stored in the memory when the diagnostic unit determines that the unmanned aerial vehicle operates normally.

14. The control system according to claim 12, further comprising a power cut-off command unit cutting off a power supply on the basis of the detection signal from the collision/crash detection unit.

15. An unmanned aerial vehicle, comprising:
a plurality of rotating bodies;
a plurality of motors individually driving and rotating the plurality of rotating bodies; and
a flight controller individually controlling the plurality of motors,
wherein the flight controller includes:
a processor configured to detect collision or crash on the basis of a signal from a sensor; and
a memory storing a detection signal from the collision/crash detection unit, and
wherein the flight controller prohibits activation or flight of the unmanned aerial vehicle when data of collision or crash is stored in the memory.

16. The unmanned aerial vehicle according to claim 15, further comprising a battery, wherein the processor is configured to cut off a power supply from the battery to prohibit activation of the unmanned aerial vehicle.

17. The unmanned aerial vehicle according to claim 15, wherein the processor is configured to read a stored data of the memory when the unmanned aerial vehicle is activated.

18. A control system of controlling an unmanned aerial vehicle, comprising:
a processor configured to detect collision or crash on the basis of a signal from a sensor; and
a memory storing a detection signal from the collision/crash detection unit; and
wherein the processor prohibits activation or flight of the unmanned aerial vehicle when data of collision or crash is stored in the memory, and
wherein the unmanned aerial vehicle comprises:
a plurality of rotating bodies;
a plurality of motors individually driving and rotating the plurality of rotating bodies; and
a flight controller individually controlling the plurality of motors.

19. The control system according to claim 18,
wherein the unmanned aerial vehicle further comprises a battery, and
wherein the processor is configured to cut off a power supply from the battery to prohibit activation of the unmanned aerial vehicle.

20. The control system according to claim 18, wherein the processor is configured to read a stored data of the memory when the unmanned aerial vehicle is activated.

* * * * *